United States Patent [19]

Sanmartin et al.

[11] Patent Number: 4,937,125
[45] Date of Patent: Jun. 26, 1990

[54] LIGHTWEIGHT SANDWICH DESIGNED FOR MAKING MULTILAYER STRUCTURES RESISTANT TO IMPACT AND THERMAL AGGRESSIONS

[75] Inventors: Marie-Louise Sanmartin, Semeac; Pierre H. Lepoetre, Soissons, both of France

[73] Assignee: Etat Francais, France

[21] Appl. No.: 208,073

[22] Filed: Jun. 17, 1988

[30] Foreign Application Priority Data

Jun. 19, 1987 [FR] France ............................ 87 08594
Aug. 27, 1987 [FR] France ............................ 87 11971

[51] Int. Cl.⁵ .................................................. B32B 3/12
[52] U.S. Cl. ...................................... 428/116; 52/806; 52/809
[58] Field of Search ....................... 52/806, 809, 811; 428/73, 116, 117, 118

[56] References Cited

U.S. PATENT DOCUMENTS

| | | | |
|---|---|---|---|
| 4,061,812 | 12/1977 | Gilwee | 428/73 X |
| 4,251,579 | 2/1981 | Lee | 428/73 |
| 4,336,090 | 6/1982 | Hilton | 428/116 X |
| 4,557,961 | 12/1985 | Gorges | 52/806 X |

FOREIGN PATENT DOCUMENTS 2504520 10/1982 France ............................ 428/73
2092950 9/1982 United Kingdom .............. 428/116

Primary Examiner—Carl D. Friedman
Assistant Examiner—Jerrold D. Johnson
Attorney, Agent, or Firm—Arnold, White & Durkee

[57] ABSTRACT

The invention concerns a sandwich designed for making multilayer structures resistant to impact and thermal aggressions of the type including a core 2 interposed between an external skin 1 and an internal skin 3.

The external skin panel 1 consists of an assembly of at least three layers made integral by sealing or bonding: a first layer 4 made of composite material, a second layer 5 made of a synthetic cellular material with a low thermal conductivity coefficient, a third layer 6 obtained by lamination of a composite material. The second layer 5 consists of a honeycomb and the composite material of the first layer 4 and third layer 6 consists of glass fiber reinforced epoxy resin. A nonwoven polyester layer 7 is interposed between layers 4 and 5. The sandwich panel includes a metal sheet 8 adhering by cofusion to layer 5 via a thermal plastic film 9, said sheet being made of aluminum or aluminum alloy, steel or titanium which can be in the form of a film with a thickness below 1 mm.

Application to making a wall for construction, in particular of buildings.

22 Claims, 1 Drawing Sheet

U.S. Patent    Jun. 26, 1990    4,937,125
FIG.1
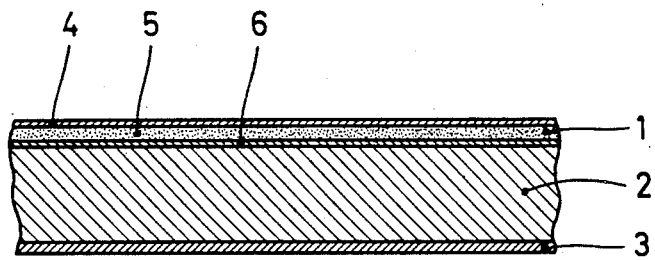
FIG.2A 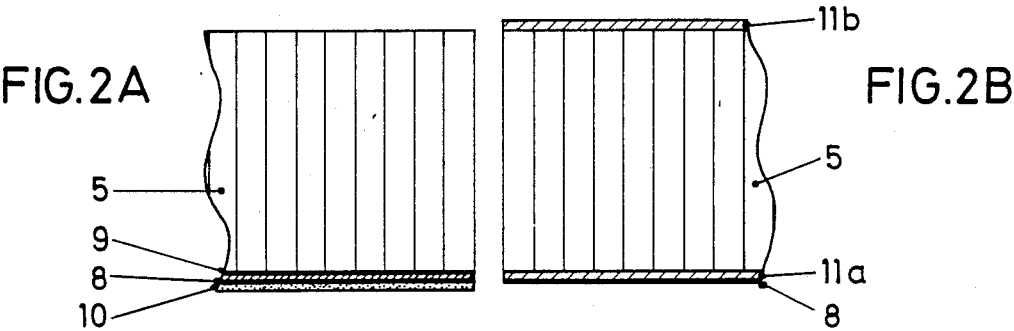 FIG.2B
FIG.3
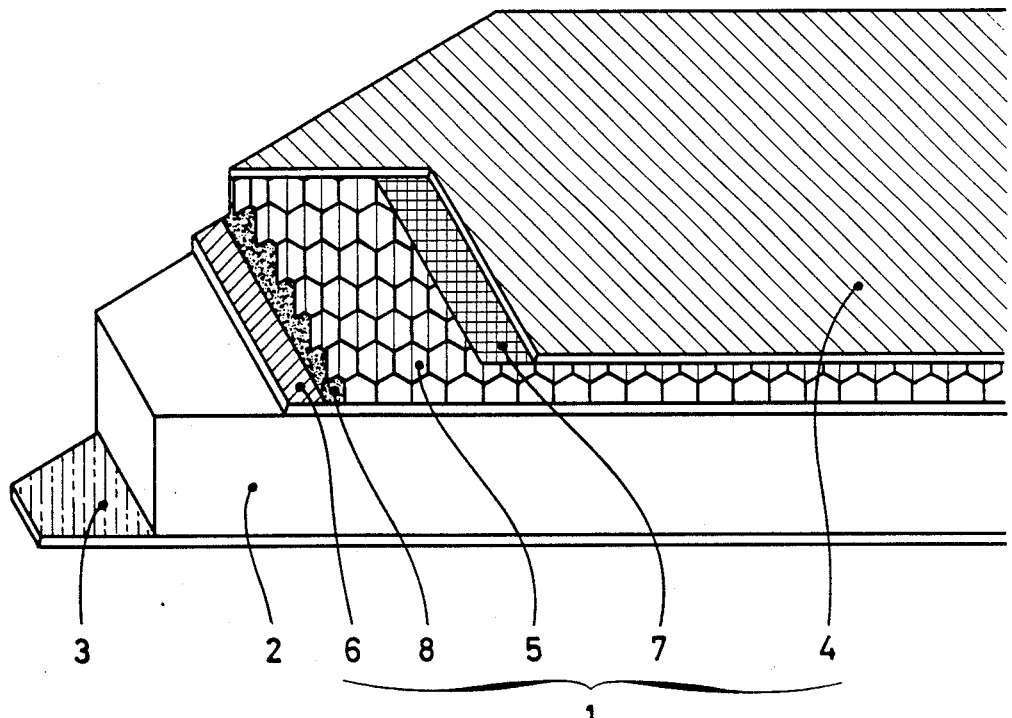

LIGHTWEIGHT SANDWICH DESIGNED FOR MAKING MULTILAYER STRUCTURES RESISTANT TO IMPACT AND THERMAL AGGRESSIONS

BACKGROUND OF THE INVENTION

The technical sector concerned by this invention is that of sandwich panels resistant to impact, flames and agents attacking organic composite materials and is designed for making multilayer walls or partitions.

The sandwich panels are used to make structures combining high stiffness, low weight and possibly high thermal insulation, as well as being self-extinguishing. They have many applications: building, aeronautics, space industry, shipbuilding, transportation, armament, etc. In addition, the constituent materials can be: metals (aluminum, titanium, steel, etc.), minerals (cellular concrete, plaster, expanded or not, etc.) or plastics (resins, organic composites reinforced by fibers, etc.).

In all cases, the sandwich panel is the result of assembly of two skins, one external and one internal, made of materials with high mechanical strength and a high deformability modulus and a low density core acting as a spacer between the panels.

The skins are made from sheet metal (Al, Ti, steel, etc.) or laminates made of resin+fibers (epoxy, polyester, phenolic, vinylester, thermoplastic resins associated with glass, carbon, aramide fibers) or extruded and/or calendered sheets (thermoplastic or other), or boards of wood (plywood, etc.) or the association of several of the above materials (for instance aluminum sheet and plywood).

The cores are divided into three major families of materials:

expanded or lightweight materials such as plastic foams, concretes, etc.

wood (balsam being the typical example), cellular materials such a honeycomb, tube spacers or self-stiffened ribbed plates, etc. To the honeycombs already known (aluminum, aramide, kraft paper, etc.) a new family of olefin thermoplastic materials insensitive to corrosion and ageing has recently been added. This family offers mechanical properties which are approximately equivalent to those of known honeycomb materials but at substantially lower costs. It has not yet been used in structural sandwich materials because it cannot be bonded or laminated to the standard skins. In addition, these olefin thermoplastic honeycombs raise problems of direct bonding with the thin metal plates.

As for the process for manufacturing the sandwich panels, it is characterized by the type of interface between the skins and the core.

There are three main ways of obtaining sandwich materials:

interface by bonding, sealing or mechanical assembly between each skin panel and the core, production of the skin panel directly in contact with the core by molding or contact lamination (e.g. concrete, resin, etc.), expansion of the core poured in situ between the two skin panels (e.g. expanded plaster, foams, etc.).

Considering the diversity of the constituent products mentioned above, it is possible to vary the properties of the sandwich panel by preferentially combining the materials according to their most advantageous properties.

Until now, the constructions and structures consisting of elementary panels were made of various materials, alone or in association, with major drawbacks. In effect:

thin metal sheets are deformed by the least shock received perpendicular or not to their surface; in addition, they are not easy to repair and do not provide thermal insulation, laminates do not withstand buckling well; they do not form a firewall and the thermal insulation they provide is relatively small, thermoplastic plates are not capable of withstanding temperature rises or flames for acceptable weights and costs per unit area, honeycombs and other tubular spacers are not thermally insulating, synthetic foams lose their mechanical properties when the temperature to which they are subjected rises above 80° to 100° C.

For guidance, reference can be made to patent EP-A-Nos. 155 335 and 111 520.

The production of a sandwich panel therefore requires the use of a number of materials in layers which must be assembled, generally by bonding or lamination.

It is known how to assemble a thermoplastic honeycomb and a woven or nonwoven fiber sheet. To do so, the base of the thermoplastic honeycomb cells is heated and the material thus softened is forced to penetrate through the fibers of the sheet. This is achieved industrially by feeding a thermoplastic honeycomb plate placed on the width of the sheet between heating rollers with suitably adjusted speed, separation and temperature. When cooled, mechanical assembly is achieved at the base of the honeycomb cells by catching of the thermoplastic resin which, when heated to semisolid state, penetrates the interstices of the sheet. This technique does not contribute any particular property to the honeycomb except mechanical assembly of its faces which provides flat surfaces on either side of the honeycomb to facilitate future interfaces.

In addition, it is very often useful to insert a metal sheet in a sandwich material to improve its thermal insulation and ageing resistance properties. Currently, it is not known how to bond a bare metal sheet directly on an olefin thermoplastic honeycomb.

SUMMARY OF THE INVENTION

The purpose of this invention is to make a sandwich panel resistant to shocks and thermal aggressions in which at least one of the external skin panels is also a sandwich material. Another object of the invention is to provide an external skin panel possibly including a metal sheet.

The object of the invention is therefore a structural sandwich panel designed for making structures of the type with a core interposed between an external and an internal skin; characterized in that the external skin consists of an assembly of at least three layers made integral with one another by sealing, bonding or lamination:

a first, external layer made of composite material, a second layer made of a cellular synthetic material with a low thermal conductivity coefficient, a third, internal layer obtained by lamination of a composite material.

An advantage of this invention resides in the fact that the sandwich panel is rigid, lightweight, low cost, self-extinguishing, a good thermal insulator for prolonged exposure to the sun and has good resistance to flames and impact. These properties are checked by various tests:

shear test to check the adhesion of the skins on the core, bending test to check the bending stiffness and the resistance to punching, fire test to simulate contact of the sandwich material with the flame of a torch applied to the external skin and check the self-extinguishing property of the sandwich material, impact test to check the impact resistance of the sandwich material skin, thermal insulation test.

The second layer preferably consists of a thermoplastic honeycomb.

The sandwich panel preferably includes a metal sheet interposed between the second and third layers.

Thus, the insulating capacity of the panel is increased so that it is possible to use cores made of expanded material whose glass transition is low, approximately 75° C., in panels which can be exposed to much higher temperatures.

The presence of the metal sheet provides the following additional advantages:

the thermal insulation is improved: in effect, the thermoplastic film can be sufficiently thin and transparent for the radiation to be reflected in major part by the metal sheet, it considerably improves the ageing resistance of the sandwich panel: in particular, it forms a sealed barrier which stops the agents attacking organic materials such as environmental agents in particular, water, gas, microorganisms, petroleum products and decontamination products.

The composite material of the first and third layers preferentially consists of glass or aramide fiber reinforced resins.

The resin incorporated in the first layer is preferably chosen from the group including epoxy, polyester, phenolic and fireproof or phenolic vinylester resins and the resin incorporated in the third layer is a fireproof epoxy resin.

The respective thickness of the first, second and third layers is 0.5 to 3 mm, 5 to 20 mm and 0.5 to 3 mm, the whole thickness of said external skin being in a range from 6 to 26 mm.

The second honeycomb layer is made of a thermoplastic material chosen from the group including polypropylene, polyethylene and their copolymers, polycarbonates, acrylonitrile/butadiene/styrene polymers, polyamides, polysulfones or polyethersulfones and liquid crystal polymers.

The second layer consists of a polypropylene honeycomb plate, with a nonwoven polyester film interposed between the first and second layers.

The second layer consists of a polypropylene honeycomb plate, with a nonwoven polyester film located on each of the faces of the plate.

The cells of the second layer are filled with an inert gas such as argon or nitrogen or placed partially under vacuum.

The metal sheet consists of aluminum or aluminum alloy, steel or titanium.

The metal layer adheres to the second layer by cofusion of this layer with a thermoplastic film.

The thermoplastic film consists of thermoplastic polyethylene or polyester.

The metal sheet is covered with a woven or nonwoven fiber layer consisting, for instance, of glass, polyester or cotton fibers.

The metal sheet is a film with a thickness less than 1 mm.

The panel includes a 0.1 mm thick aluminum film and a 10 mm thick polypropylene honeycomb.

The core consists of a plate of polystyrene, polyurethane, polyvinylchloride or polyethylene foam and the internal skin is identical to the external skin or consists of a metal plate, for instance aluminum, or a thermoplastic resin reinforced with glass, carbon or aramide fibers.

The sandwich panel includes:

an external skin including a first layer consisting of fireproof epoxy resin and glass fiber, a second layer consisting of a polypropylene honeycomb with a nonwoven polyester film on both faces, the first layer being laminated on the nonwoven sheet, an aluminum film bonded by an epoxy resin on the sheet of the second layer, the third epoxy resin and glass fiber composite layer laminated on the metal film, an expanded polyurethane, polyvinylchloride, polyethylene or polystyrene core bonded to the third layer, an internal skin bonded to the core and consisting either of a metal plate or an external skin.

The manufacturing process for a sandwich panel according to the invention is original in that the first and third layers are made separately or simultaneously by lamination in contact with the second layer to form the external skin, the core and the internal skin being connected to the external skin bonding or lamination, the resulting assembly being compressed before polymerization of the lamination resin. A manufacturing process for a skin for a sandwich panel according to the invention is original in that: firstly a thermoplastic film is interposed between the metal sheet and the second layer, the assembly is subjected to a pressure between $10^5$ and $10^6$ Pa for one to five seconds and a temperature close to the fusion temperature of the second layer in the thermoplastic film, and secondly said first and third layers are bonded or laminated on said second layer.

The thermoplastic polyethylene film is first deposited on the metal sheet, during the process.

The metal sheet is sandwiched between the thermoplastic film and a woven or nonwoven fiber layer, before the begining of the process.

Another advantage resides in the simplicity of industrial implementation of the sealing process of the metal sheet to the olefin thermoplastic honeycomb by using conventional roller machines.

The invention can be applied whenever it is wished to industrially produce a structural sandwich panel tolerant to the damage resulting from aggression by impact, flames and ageing, for instance to obtain the walls of buildings, ships, railcars, etc. with a weight per unit area less than 10 kg/m². In particular, use is made of an off-the-shelf, low cost olefin thermoplastic material for the honeycomb, offering mechanical properties similar to those of known cellular materials made of aluminum alloy, aramide or phenolic resin or paper.

BRIEF DESCRIPTION OF THE DRAWINGS

Other advantages of the invention will become clear by reading the addition to the description given below of an embodiment given as example in relation with the drawing where:

FIG. 1 illustrates a cross section of the sandwich material according to the invention, FIGS. 2A and 2B are a sectional views showing the assembly of a metal sheet and a honeycomb, FIG. 3 illustrates the structure of an example of embodiment of a sandwich material according to the invention showing the detail of the external skin panel.

DETAILED DESCRIPTION OF THE PREFERRED EMBODIMENTS

FIG. 1 shows the cross section of a sandwich panel including skin 1, core 2 and skin panel 3. Skin panel 1 is said to be external, i.e. it is placed on the side exposed to the various aggressions which may occur. Skin 3 may of course be the same as skin 1. It can be conventional, as shown schematically in the figure, i.e., consisting of a simple metal skin made of aluminum, steel or titanium or can be made of thermoplastic synthetic materials such as polyvinylchloride or composites such as laminated resin associated with glass, carbon, aramide fibers.

Core 2 is made of an off-the-shelf extruded polystyrene polyvinylchloride, or polyethylene plate.

Skin panel 1 is advantageously made of a multilayer system with a low thickness, at least 5 mm. It includes a first layer 4 or external skin, a second layer 5 and a third layer 6 or internal skin.

Layer 4, a few millimeters thick, is made by lamination of a fireproof thermosetting resin and fillers (glass, carbon, aramide fibers or other fibers). A thin metal sheet can even be considered, if there are no problems of impact resistance or requirement for repair. If, in addition, fire resistance is not of prime importance, a thermoplastic resin skin gives satisfaction. The thickness is advantageously chosen between 0.5 and 3 mm, and more particularly between 1 and 2 mm. The thermosetting resin is chosen from the epoxy, polyester or phenolic resins, possibly dyed a dark color, for instance black, to limit the internal thermal radiation of this layer.

The second layer 5, for a few millimeters to a few centimeters thick, for instance 5 to 20 mm, is made of a material with high compression strength. Depending on the real practical application of the material, it will be required of this layer 5 not to release any toxic gases or smokes when burning, and to have a low thermal conductivity coefficient. Layer 5 will therefore in this case be a cellular product, of the honeycomb type, made of thermoplastic material of the polypropylene type or of acrylonitrile/butadiene/styrene polymer or polycarbonate, etc. The cells can advantageously be filled with inert gas (nitrogen, argon, etc.) or placed partially under vacuum according to a conventional technique which it is not necessary to explain to understand the invention.

Layer 6 can be of the same design as layer 4. When it is exposed to sunlight or a heat source, the face of layer 6 adjacent to layer 5 radiates energy to layer 4. It is advantageous to increase the thermal emission coefficient of this layer by providing, for instance, FIG. 2A, aluminum film 8 at the interface between layer 5 and layer 6. Absorption of heat radiation from layer 6 is thereby considerably decreased and this layer therefore remains cold for a longer period. As an alternate, the aluminum film can be covered with a filmogen thermoplastic material sealed by compression under heat onto layer 5. Polished aluminum film 8 is made to adhere to layer 5 consisting of a polypropylene honeycomb by interposing polyethylene layer 9. The nature of layer 9 is in this case of the same chemical family as layer 5, but could be identical. It is sufficient for these layers to be made of mutually compatible materials as concerns the sealing parameters. These layers can be used separately, but it is preferred to use an off-the-shelf product as shown in FIG. 2A including the aluminum film on which is already attached polyethylene layer 9 on one side and cotton layer 10 on the other. Aluminum film 8 is applied to honeycomb 5 on the polyethylene film side 9 then the assembly is subjected to a pressure of approximately $2 \times 10^5$ Pa and a temperature of approximately 220° C. for 2 s. This process achieves the fusion at this temperature of the polyethylene and adjacent polypropylene layer, creating a rigid bond between the aluminum film and the honeycomb. The fusion of the thermoplastic film is complete in the location of the base of the cells, whereas the fusion of the thermoplastic honeycomb concerns only its upper layer. A roller type machine with temperature control is used; the time required for sealing is adjusted by adjusting the roller rotation speed.

Polyethylene layer 9 could of course be deposited on the honeycomb then the metal sheet, with no substantial modification of the process, before introduction in the machine.

It is also possible to use, as is shown in FIG. 2B, honeycomb layer 5 including on both faces a nonwoven polyester sheet 11a and 11b; this product is off the shelf. Bare metal sheet 8 is bonded to sheet 11a then layer 6 is directly laminated on this metal sheet. Layers 9 and 10 of the example as per FIG. 2A then no longer exist.

According to the application considered, the aluminum film can be replaced by a film of any metal, for instance steel or titanium.

When thermoplastic film 9 is sealed to the surface layer of the honeycomb, the fusion temperature varies according to the nature of this film and of the honeycomb. Concerning the tests conducted on off-the-shelf materials, it was determined that the temperature range of operation is approximately 150° C. to 250° C. It is therefore sufficient for the thermal sealing parameters of the materials to be mutually compatible in a range of approximately 10° C. without substantially modifying the quality of the rigid bond obtained.

All of layers 4, 5, 6 and aluminum film 8 are assembled by bonding, lamination or sealing, and form skin panel 1.

The other layers, extruded polystyrene core 2, 3 to 5 cm thick and skin panel 3 of the sandwich panel, are bonded or laminated on skin panel 1 in a known way.

EXAMPLE OF A PREFERRED EMBODIMENT

FIG. 3 shows a sandwich panel whose various layers are assembled first by making skin 1, from outside to inside. This order is not mandatory and could readily be modified by a craftsman.

External skin 1

The external skin has the form of a multilayer structure consisting of layers 4, 5 and 6. Layer 4 is made of composite, consisting of fireproof epoxy resin and glass fibers and is approximately 1.5 mm thick. Layer 5 is a polypropylene honeycomb 10 mm thick whose face on the side of layer 4 is covered with a nonwoven polyester film 7 of 0.2 mm thickness.

Layer 4 is laminated directly in contact with honeycomb layer 5 on the side of nonwoven polyester layer 7. The bond of layer 4 with layer 5 is therefore immediate.

On the other face of honeycomb layer 5, the ordered three-layer polyethylene/aluminum/cotton film 9, 8, 10 is deposited by sealing. By sealing, a bond is created between the honeycomb polypropylene and the polyethylene layer 9 of the film. This three-layer film is 023 mm thick.

As an alternative a honeycomb plate with a nonwoven polyester sheet on one of its faces can be used. Layer 4 is laminated on one of the faces and metal sheet 8 is bonded to the other face by an epoxy resin as shown in FIG. 2B.

Epoxy resin/glass fiber composite layer 6 is then laminated, with a thickness of 1 mm. It is laminated either directly on cotton cloth 10 of the three-layer film 9, 8, 10 or on the bare metal sheet as shown in FIG. 2B. The thickness of said external layer is then 13 mm.

Core 2

Core 2, 30 mm thick, consists of an extruded polystyrene plate. It is deposited on layer 6 before polymerization of the epoxy resin. By compression and after polymerization, core 2 becomes integral with this layer 6. The core can be made of expanded polyurethane, polyvinylchloride or polyethylene. All these materials have a glass transition temperature of approximately 75° C.

Internal skin panel 3

Finally, aluminum alloy sheet 3, 1 mm thick, is bonded to the other face of core 2.

Such a panel has a weight per unit area less than 10 kg/m$^2$ and has good properties of:
stiffness,
temperature withstand capability,
thermal insulation,
impact resistance of the skin panel,
buckling resistance of the skin panel,
resistance to punching of the skin panel,
self-extinguishing capability.

On a sandwich panel as shown in FIG. 3, bending, shear, fire resistance, impact, thermal insulation, insolation and flammability tests were conducted and demonstrated the advantage of this type of structure.

BENDING TEST

A sandwich panel 750 mm long and 400 mm wide supported by two cylinders with a radius of 50 mm is subjected to compression in the middle. The minimum ultimate fracture load obtained is 11,000N.

SHEAR TEST

The core of the sandwich panel is immobilized and external skin panel 1 is subjected to a tensile stress by a jaw at a rate of $4.2 \times 10^{-4}$ m/s. The minimum shear fracture stress obtained is $3 \times 10^5$ Pa.

IMPACT TEST

A 3 kg ball is dropped from a height of 2 m onto external skin panel 1 of a sandwich panel supported on a wooden frame. After many tests, no deformation is observed in the location of the impacts. Only a very slight delamination of layer in the location of the impacts is detected.

FIRE RESISTANCE

A flame at 1000° C. is applied perpendicularly to a 600 mm × 600 mm sandwich panel for 72 seconds on external skin panel 1. After removal of the flame, the extinction time is measured and is less than 10 seconds.

THERMAL INSULATION TEST

An insulating box structure is made with sandwich panels and exposed to the sun for one day. It is observed that the temperature inside the box always remains below the temperature of use of core 2 which is approximately 75° C. In addition, the temperature inside the box does not substantially vary, which demonstrates the insulating power of the sandwich panel.

During exposure to the sun, layer 4, directly subjected to the radiation, absorbs energy and therefore heats up. In addition, it radiates energy proportionally to its temperature.

The share of radiation emitted inwards in the sandwich panel crosses honeycomb layer 5 and is reflected by the aluminum of film 8. This radiation is again absorbed by layer 4.

In this way, layer 4 radiates outwards whereas layer 6 remains cold. The temperature of the foam of core 2 remains substantially below its temperature of use (75° C.). The only inward heat exchange in the sandwich panel is by convection. The thermal insulation of the sandwich structure is improved even more by introducing a gas with a low thermal conductivity such as nitrogen or argon in the cells.

FLAMMABILITY TEST

During exposure to a torch, the resin of layer 4, even fireproofed, is consumed and the polypropylene of the honeycomb of layer 5 melts on the surface. Layer 6 is not damaged. The polystyrene foam of core 2 remains intact. Combustion totally stops as soon as the flame is removed. The damaged area is then repairable.

The sandwich panel according to the invention can be used in all types of construction:
walls for a modular first-aid hospital,
framework panels,
lightweight rigid structures for the transportation facility manufacturing industries (naval, rail, air, road),
shockproof and fireproof containers for valuable objects, works of art, fissile materials.

We claim:

1. A structural sandwich panel which is resistant to shock and thermal aggression, comprising:
an external skin which is directly exposed to said shock and thermal aggression, said external skin consisting of a first external layer of composite material, a second intermediate layer of a cellular synthetic material which has a low thermal conductivity coefficient, a third internal layer of laminated composite material, and a metal sheet interposed between the second intermediate layer and the third internal layer, said layers being integrally joined together by sealing, bonding, or laminating;
an internal skin; and
a core interposed between said external skin and said internal skin.

2. The structural sandwich panel of claim 1, wherein the composite material of the first external layer and the third internal layer consist of glass or aramide fiber reinforced resins.

3. The structural sandwich panel of claim 2, wherein the resin included in the first external layer comprises at least one resin selected from the group consisting of epoxy, polyester, phenolic and fireproof or phenolic vinylester resins, and the resin included in the third internal layer consists of a fireproof epoxy resin.

4. The structural sandwich panel of claim 1, wherein said first external layer, said second intermediate layer, and said third internal layer, each have a thickness of 0.5–3 mm, 5–20 mm, and 0.5–3 mm, respectively.

5. The structural sandwich panel of claim 1, wherein said second intermediate layer consists of a thermoplastic honeycomb.

6. The structural sandwich panel of claim 5, wherein the thermoplastic honeycomb comprises at least one thermoplastic material selected from the group consisting of polypropylene and copolymers thereof, polyethylene and copolymers thereof, polycarbonates, acrylonitrile/butadiene/styrene polymers, polyamides, polysulfones or polyethersulfones, and liquid crystal polymers.

7. The structural sandwich panel of claim 5, wherein cells of the honeycomb layer are filled with an inert gas selected from the group consisting of argon and nitrogen, or are placed under a partial vacuum.

8. The structural sandwich panel of claim 1, wherein said second intermediate layer consists of a polypropylene honeycomb plate, and a nonwoven polyester film is interposed between said first external layer and said second intermediate layer.

9. The structural sandwich panel of claim 1, wherein said second intermediate layer consists of a polypropylene honeycomb plate and nonwoven polyester films deposited on opposing surfaces of the honeycomb plate.

10. The structural sandwich panel of claim 1, wherein said metal sheet comprises at least one material selected from the group consisting of aluminum or an alloy thereof, steel, and titanium.

11. The structural sandwich panel of claim 1, wherein said metal sheet is fixed to said second intermediate layer by cofusion with a thermoplastic foam.

12. The structural sandwich panel of claim 11, wherein said thermoplastic foam comprises at least one material selected from the group consisting of polyethylene and thermoplastic polyester.

13. The structural sandwich panel of claim 1, wherein said metal sheet is covered with a woven or nonwoven fiber layer comprising at least one material selected from the group consisting of glass, polyester, and cotton fibers.

14. The structural sandwich panel of claim 1, wherein said metal sheet has a thickness of less than 1 mm.

15. The structural sandwich panel of claim 1, wherein said second intermediate layer consists of a polypropylene honeycomb layer having a thickness of 10 mm and said metal plate consists of an aluminum film having a thickness of 0.2 mm.

16. The structural sandwich panel of claim 1, wherein said core comprises a plate of at least one expanded material selected from the group consisting of polystyrene, polyurethane, polyvinylchloride, and polyethylene foam, and said internal skin consists of the same material as said external skin.

17. The structural sandwich panel of claim 1, wherein said core comprises a plate of at least one expanded material selected from the group consisting of polystyrene, polyurethane, polyvinylchloride, and polyethylene foam, and said internal skin consists of an aluminum plate or a thermoplastic resin.

18. A method of manufacturing the sandwich panel according to claim 1, wherein said first external layer and said third internal layer are made separately or simultaneously by laminating via a resin with said second intermediate layer and said metal sheet to form said external skin, and said core and said internal skin are fixed to said external skin by bonding or laminating, said external skin, said internal skin and said core then being compressed before polymerization of said resin employed in the laminating steps.

19. A method of manufacturing the structural sandwich panel of claim 1, sequentially comprising:
   interposing a thermoplastic foam between said metal sheet and said second intermediate layer;
   subjecting said thermoplastic foam, said metal sheet and said second intermediate layer to a pressure of $10^5$ to $10^6$ Pa for 1 to 5 seconds, and at a temperature close to the fusion temperature of said second intermediate layer and said thermoplastic foam;
   bonding or laminating said first external layer and said third internal layer to said second intermediate layer;
   bonding or laminating said core and said internal skin to said external skin; and
   compressing said external skin, said internal skin and said core.

20. A method of manufacturing the structural sandwich panel of claim 1, sequentially comprising:
   depositing a polyethylene thermoplastic film on said metal sheet;
   pressing said polyethylene thermoplastic film into contact with said second intermediate layer;
   subjecting said polyethylene thermoplastic film, said metal sheet and said second intermediate layer to a pressure of $10^5$ to $10^6$ Pa for 1 to 5 seconds, and at a temperature close to the fusion temperature of said second intermediate layer and said thermoplastic foam;
   bonding or laminating said first external layer and said third internal layer to said second intermediate layer;
   bonding or laminating said core and said internal skin to said external skin; and
   compressing said external skin, said internal skin and said core.

21. The method of claim 20, wherein said metal sheet is sandwiched between said thermoplastic foam and a woven or nonwoven fiber layer, such that said second intermediate layer contacts said thermoplastic foam.

22. A structural sandwich panel which is resistant to shock and thermal aggression, comprising:
   an external skin which is directly exposed to said shock and thermal aggression, said external skin consisting sequentially of the following layers, when viewed in a direction from the area of said shock and thermal aggression towards an internal portion of said structural sandwich panel,
   (a) a first external layer consisting of fireproof epoxy resin and glass fibers,
   (b) a second intermediate layer consisting of an upper nonwoven polyester sheet, a polypropylene honeycomb, an internal nonwoven polyester sheet, and an aluminum film, said first external layer being laminated on said external nonwoven polyester sheet, and said aluminum film being bonded by an epoxy resin onto said internal nonwoven polyester sheet, and
   (c) a third internal layer consisting of a composite material of epoxy resin and glass fiber, said third internal layer being laminated on said aluminum film of said second intermediate layer;
   a core comprising at least one expanded material selected from the group consisting of polyurethane, polyvinylchloride, polyethylene, and polystyrene, said core being bonded to said internal third layer of said external skin; and
   an internal skin consisting of a metal sheet, or the same material as said external skin, said internal skin being bonded to said core.

* * * * *